United States Patent [19]
Smith

[11] Patent Number: 5,243,449
[45] Date of Patent: Sep. 7, 1993

[54] AMBIENT TURN-ON SUPPRESSION HOLOGRAM

[75] Inventor: Ronald T. Smith, Torrance, Calif.

[73] Assignee: Hughes Aircraft Company, Los Angeles, Calif.

[21] Appl. No.: 836,198

[22] Filed: Feb. 13, 1992

Related U.S. Application Data

[63] Continuation of Ser. No. 626,803, Dec. 13, 1990, abandoned.

[51] Int. Cl.$^5$ .............................. G02B 5/32; G02B 5/30
[52] U.S. Cl. ........................ 359/13; 340/479;
359/15; 359/24; 359/494; 359/630
[58] Field of Search ............ 350/3.7, 3.77, 174,
350/400; 359/13, 14, 15, 22, 24, 630, 633, 494, 499

[56] References Cited

U.S. PATENT DOCUMENTS

| | | | |
|---|---|---|---|
| 4,601,533 | 7/1986 | Moss | 350/3.77 |
| 4,790,613 | 12/1988 | Moss | 350/3.7 |
| 4,798,426 | 1/1989 | Malcolm et al. | 350/3.7 |
| 4,892,369 | 1/1990 | Moss | 350/3.7 |
| 4,916,593 | 4/1990 | Moss et al. | 350/3.7 |
| 4,932,731 | 6/1990 | Suzuki et al. | 350/3.7 |
| 4,966,426 | 10/1990 | Moss et al. | 350/3.7 |
| 4,973,132 | 11/1990 | McDonald et al. | 350/3.7 |
| 5,013,107 | 5/1991 | Biles | 350/3.7 |
| 5,138,470 | 8/1992 | Moss et al. | 359/13 |

*Primary Examiner*—Martin Lerner
*Attorney, Agent, or Firm*—L. A. Alkov; W. K. Denson-Low

[57] ABSTRACT

A guard hologram blocks ambient turn-on of an image hologram. In a center high-mounted rearview stoplight assembly, a guard hologram is used to prevent ambient turn-on by the sun and still allow optical transparency of the image hologram. The guard hologram preferred is optically mounted to the lamp side of the image hologram and includes two 0-degree reflection holograms separated by a halfwave film.

7 Claims, 7 Drawing Sheets

FIG. 4

| Angle | 400 | 420 | 440 | 460 | 480 | 500 | 520 | 540 | 560 | 580 | 600 | 620 | 640 | 660 | 680 | 700 |
|---|---|---|---|---|---|---|---|---|---|---|---|---|---|---|---|---|
| 10 | 0 | 0 | 0 | 0 | 0 | 0 | 0 | 0 | 0 | 0 | 0 | 0 | 0 | 0 | 0 | 1 |
| 11 | 0 | 0 | 0 | 0 | 0 | 0 | 0 | 0 | 0 | 0 | 0 | 0 | 0 | 0 | 1 | 1 |
| 12 | 0 | 0 | 0 | 0 | 0 | 0 | 0 | 0 | 0 | 0 | 0 | 0 | 0 | 1 | 1 | 1 |
| 13 | 0 | 0 | 0 | 0 | 0 | 0 | 0 | 0 | 0 | 0 | 0 | 0 | 1 | 1 | 1 | 1 |
| 14 | 0 | 0 | 0 | 0 | 0 | 0 | 0 | 0 | 0 | 0 | 0 | 1 | 1 | 1 | 1 | 1 |
| 15 | 0 | 0 | 0 | 0 | 0 | 0 | 0 | 0 | 0 | 0 | 1 | 1 | 1 | 1 | 1 | 1 |
| 16 | 0 | 0 | 0 | 0 | 0 | 0 | 0 | 0 | 0 | 1 | 1 | 1 | 1 | 1 | 1 | 1 |
| 17 | 0 | 0 | 0 | 0 | 0 | 0 | 0 | 0 | 1 | 1 | 1 | 1 | 1 | 1 | 1 | 1 |
| 18 | 0 | 0 | 0 | 0 | 0 | 0 | 0 | 1 | 1 | 1 | 1 | 1 | 1 | 1 | 1 | 1 |
| 19 | 0 | 0 | 0 | 0 | 0 | 0 | 0 | 1 | 1 | 1 | 1 | 1 | 1 | 1 | 1 | 0 |
| 20 | 0 | 0 | 0 | 0 | 0 | 0 | 1 | 1 | 1 | 1 | 1 | 1 | 1 | 1 | 0 | 0 |
| 21 | 0 | 0 | 0 | 0 | 0 | 1 | 1 | 1 | 1 | 1 | 1 | 1 | 0 | 0 | 0 | 0 |
| 22 | 0 | 0 | 0 | 0 | 1 | 1 | 1 | 1 | 1 | 1 | 1 | 0 | 0 | 0 | 0 | 0 |
| 23 | 0 | 0 | 0 | 1 | 1 | 1 | 1 | 1 | 1 | 0 | 0 | 0 | 0 | 0 | 0 | 0 |
| 24 | 0 | 0 | 0 | 1 | 1 | 1 | 1 | 1 | 0 | 0 | 0 | 0 | 0 | 0 | 0 | 0 |
| 25 | 0 | 0 | 1 | 1 | 1 | 1 | 1 | 0 | 0 | 0 | 0 | 0 | 0 | 0 | 0 | 0 |
| 26 | 0 | 0 | 1 | 1 | 1 | 1 | 0 | 0 | 0 | 0 | 0 | 0 | 0 | 0 | 0 | 0 |
| 27 | 0 | 0 | 1 | 1 | 1 | 1 | 0 | 0 | 0 | 0 | 0 | 0 | 0 | 0 | 0 | 0 |
| 28 | 0 | 0 | 0 | 1 | 1 | 1 | 0 | 0 | 0 | 0 | 0 | 0 | 0 | 0 | 0 | 0 |
| 29 | 0 | 1 | 1 | 1 | 1 | 1 | 0 | 0 | 0 | 0 | 0 | 0 | 0 | 0 | 0 | 0 |

FIG. 5

| Angle | 400 | 420 | 440 | 460 | 480 | 500 | 520 | 540 | 560 | 580 | 600 | 620 | 640 | 660 | 680 | 700 |
|---|---|---|---|---|---|---|---|---|---|---|---|---|---|---|---|---|
| 10 | 0.02 | 0.05 | 0.09 | 0.13 | 0.15 | 0.16 | 0.15 | 0.12 | 0.07 | 0.03 | 0 | 0 | 0.05 | 0.13 | 0.26 | 0.41 |
| 11 | 0.07 | 0.12 | 0.16 | 0.18 | 0.18 | 0.15 | 0.11 | 0.06 | 0.02 | 0 | 0.02 | 0.08 | 0.19 | 0.34 | 0.51 | 0.67 |
| 12 | 0.15 | 0.19 | 0.2 | 0.19 | 0.15 | 0.1 | 0.04 | 0.01 | 0 | 0.04 | 0.13 | 0.26 | 0.43 | 0.6 | 0.76 | 0.88 |
| 13 | 0.22 | 0.23 | 0.2 | 0.15 | 0.09 | 0.03 | 0 | 0.01 | 0.08 | 0.19 | 0.34 | 0.52 | 0.7 | 0.84 | 0.94 | 0.96 |
| 14 | 0.25 | 0.21 | 0.14 | 0.07 | 0.02 | 0 | 0.03 | 0.12 | 0.26 | 0.43 | 0.61 | 0.78 | 0.91 | 0.98 | 0.97 | 0.89 |
| 15 | 0.21 | 0.14 | 0.06 | 0.01 | 0 | 0.06 | 0.17 | 0.33 | 0.51 | 0.7 | 0.86 | 0.96 | 1 | 0.95 | 0.84 | 0.68 |
| 16 | 0.13 | 0.05 | 0 | 0.01 | 0.09 | 0.22 | 0.39 | 0.59 | 0.77 | 0.91 | 0.99 | 0.99 | 0.91 | 0.78 | 0.6 | 0.41 |
| 17 | 0.04 | 0 | 0.02 | 0.12 | 0.27 | 0.46 | 0.65 | 0.83 | 0.95 | 0.99 | 0.96 | 0.86 | 0.7 | 0.51 | 0.33 | 0.18 |
| 18 | 0 | 0.03 | 0.14 | 0.31 | 0.51 | 0.7 | 0.86 | 0.96 | 0.97 | 0.91 | 0.78 | 0.61 | 0.42 | 0.25 | 0.12 | 0.04 |
| 19 | 0.04 | 0.16 | 0.33 | 0.54 | 0.72 | 0.87 | 0.94 | 0.92 | 0.84 | 0.69 | 0.51 | 0.33 | 0.18 | 0.07 | 0.01 | 0 |
| 20 | 0.16 | 0.34 | 0.54 | 0.72 | 0.84 | 0.89 | 0.85 | 0.74 | 0.59 | 0.41 | 0.25 | 0.12 | 0.03 | 0 | 0.01 | 0.03 |
| 21 | 0.32 | 0.51 | 0.68 | 0.78 | 0.81 | 0.75 | 0.63 | 0.48 | 0.31 | 0.17 | 0.07 | 0.01 | 0 | 0.02 | 0.05 | 0.08 |
| 22 | 0.45 | 0.6 | 0.69 | 0.7 | 0.64 | 0.52 | 0.37 | 0.22 | 0.1 | 0.03 | 0 | 0.01 | 0.04 | 0.07 | 0.09 | 0.09 |
| 23 | 0.5 | 0.58 | 0.58 | 0.51 | 0.39 | 0.26 | 0.14 | 0.05 | 0.01 | 0 | 0.03 | 0.06 | 0.09 | 0.1 | 0.1 | 0.07 |
| 24 | 0.44 | 0.44 | 0.37 | 0.27 | 0.17 | 0.07 | 0.02 | 0 | 0.02 | 0.05 | 0.09 | 0.11 | 0.11 | 0.09 | 0.06 | 0.03 |
| 25 | 0.29 | 0.25 | 0.17 | 0.09 | 0.03 | 0 | 0.01 | 0.04 | 0.08 | 0.11 | 0.12 | 0.12 | 0.09 | 0.05 | 0.02 | 0 |
| 26 | 0.13 | 0.08 | 0.03 | 0 | 0 | 0.03 | 0.07 | 0.11 | 0.13 | 0.13 | 0.11 | 0.08 | 0.04 | 0.02 | 0 | 0 |
| 27 | 0.02 | 0 | 0 | 0.03 | 0.06 | 0.11 | 0.14 | 0.15 | 0.14 | 0.11 | 0.07 | 0.03 | 0.01 | 0 | 0.01 | 0.02 |
| 28 | 0.01 | 0.03 | 0.06 | 0.11 | 0.15 | 0.17 | 0.17 | 0.14 | 0.1 | 0.06 | 0.02 | 0 | 0 | 0.01 | 0.02 | 0.03 |
| 29 | 0.07 | 0.12 | 0.16 | 0.19 | 0.19 | 0.17 | 0.14 | 0.09 | 0.04 | 0.01 | 0 | 0 | 0.02 | 0.03 | 0.04 | 0.03 |

FIG. 6

| Angle | 400 | 420 | 440 | 460 | 480 | 500 | 520 | 540 | 560 | 580 | 600 | 620 | 640 | 660 | 680 | 700 |
|---|---|---|---|---|---|---|---|---|---|---|---|---|---|---|---|---|
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0.01 | 0 |
| 12 | 0 | 0 | 0 | 0 | 0 | 0 | 0 | 0 | 0 | 0 | 0 | 0 | 0 | 0.04 | 0.02 | 0 |
| 13 | 0 | 0 | 0 | 0 | 0 | 0 | 0 | 0 | 0 | 0 | 0 | 0 | 0.16 | 0.05 | 0.02 | 0 |
| 14 | 0 | 0 | 0 | 0 | 0 | 0 | 0 | 0 | 0 | 0 | 0 | 0.37 | 0.17 | 0.06 | 0.02 | 0 |
| 15 | 0 | 0 | 0 | 0 | 0 | 0 | 0 | 0 | 0 | 0.86 | 0.62 | 0.38 | 0.16 | 0.06 | 0.02 | 0 |
| 16 | 0 | 0 | 0 | 0 | 0 | 0 | 0 | 0 | 0.83 | 0.79 | 0.61 | 0.33 | 0.12 | 0.05 | 0.01 | 0 |
| 17 | 0 | 0 | 0 | 0 | 0 | 0 | 0 | 0.71 | 0.58 | 0.6 | 0.49 | 0.23 | 0.07 | 0.03 | 0.01 | 0 |
| 18 | 0 | 0 | 0 | 0 | 0 | 0 | 0 | 0.45 | 0.31 | 0.36 | 0.32 | 0.13 | 0.03 | 0.02 | 0 | 0 |
| 19 | 0 | 0 | 0 | 0 | 0 | 0.08 | 0.26 | 0.21 | 0.1 | 0.15 | 0.15 | 0.04 | 0.01 | 0 | 0 | 0 |
| 20 | 0 | 0 | 0 | 0 | 0 | 0.02 | 0.1 | 0.05 | 0.01 | 0.02 | 0.04 | 0 | 0 | 0 | 0 | 0 |
| 21 | 0 | 0 | 0 | 0 | 0.02 | 0 | 0.01 | 0.04 | 0.02 | 0 | 0 | 0 | 0.01 | 0 | 0 | 0 |
| 22 | 0 | 0 | 0 | 0 | 0 | 0.01 | 0.01 | 0.04 | 0.08 | 0.04 | 0.02 | 0.02 | 0 | 0 | 0 | 0 |
| 23 | 0 | 0 | 0 | 0 | 0.01 | 0.03 | 0.05 | 0.1 | 0.13 | 0.1 | 0.05 | 0 | 0 | 0 | 0 | 0 |
| 24 | 0 | 0 | 0 | 0.01 | 0.02 | 0.05 | 0.1 | 0.15 | 0 | 0 | 0 | 0 | 0 | 0 | 0 | 0 |
| 25 | 0 | 0 | 0 | 0.01 | 0.03 | 0.06 | 0.12 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 | 0 | 0 | 0 | 0 |
| 29 | 0 | 0 | 0 | 0 | 0 | 0 | 0 | 0 | 0 | 0 | 0 | 0 | 0 | 0 | 0 | 0 |
| V(I) | 0.00 | 0.00 | 0.02 | 0.06 | 0.14 | 0.32 | 0.71 | 0.95 | 1.00 | 0.87 | 0.63 | 0.38 | 0.18 | 0.06 | 0.02 | 0.00 |

AMBIENT TURN-ON SUPPRESSION HOLOGRAM

This is a continuation of application Ser. No. 07/626,803 filed Dec. 13, 1990 now abandoned.

FIELD OF THE INVENTION

The present invention relates to holograms and, more particularly, to holograms provided for use in environments where the hologram may be susceptible to ambient turn-on.

BACKGROUND OF THE INVENTION

Presently, automobiles produced for the United States market must be provided with a high-mounted, centered rear brake light in order to maximize the visibility of a caution indicator to drivers following the vehicle. The present state of the art uses a physical stoplight placed within the rearview window area, either on the rear dash surface or extending down from the roof of the car. This places the high-mounted stoplight in the optimum position for drivers following the vehicle; however, it also places a physical obstruction in the line of sight or viewing angle of the automobile's driver through his rearview mirror.

The configuration and position of the mounting of these high-mounted, centered brake lights also detract from the aesthetic design characteristics of the vehicle. Furthermore, many vehicles now offer spoilers or luggage racks as options. High-mounted stoplights are legally required to be visible from +10 degrees to −5 degrees in the vertical field behind the car. In most cases, the luggage rack or spoiler trunk mount options would not permit using dash mounted stoplights. One cannot simply move the stoplight higher up on the rear window, because the obstruction becomes more objectionable as it moves towards the center of the window. Placement of the stoplight at the top of the rear window or otherwise outside of the car becomes increasingly more expensive and aesthetically detracting.

A holographic rear window stoplight was disclosed in U.S. Pat. No. 4,892,369, and a "remotely illuminated transparent holographic stoplight for automobiles" was disclosed in U.S. Pat. No. 4,916,593. These holographic stoplights eliminate the physical centered stoplight from the rear window.

An optically transparent transmission hologram member is laminated onto the surface of the rear window. Therefore, it may be mounted high enough up on the rear window to allow diffracted light to clear a spoiler or luggage rack and, because of being transparent, the hologram is not an obstruction to the driver's rear view. The light source needed to activate the hologram is mounted in the rear deck below the rear window, and thereby out of the line of sight of the driver.

At certain times of the day there is a significant problem with holographic stoplights like that shown in U.S. Pat. No. 4,892,369. The sun, or any ambient source, will reach precisely the right angle to illuminate the hologram, be diffracted by that hologram toward the driver's rearview mirror, and enter and interfere with the driver's vision. This phenomenon is called ambient turn-on. Other sources will also be seen outside the vehicle which produce ambient turn-on.

Thus, in any environment where there is an intensive ambient source, a holographic film will be susceptible to ambient turn-on. This phenomenon is generally unwanted because the activation of the hologram should be controlled.

OBJECTS OF THE INVENTION

It is therefore an object of the invention to provide a guard hologram for preventing ambient turn-on in holograms placed in an ambient environment;

It is a further object of the invention to provide an improved rear window stoplight assembly capable of being mounted within the field of view of the rearview window of the vehicle without ever obscuring the vision of a driver;

It is yet a further object of the invention to provide a rear window stoplight assembly which includes a substantially transparent holographic rear window stoplight; and It is yet a still further object of the invention to provide a rear window stoplight assembly utilizing a substantially transparent holographic rear window stoplight mountable on the rear window of the vehicle which is substantially immune from ambient turn-on.

SUMMARY OF THE INVENTION

These and other objects of the invention are provided by a hologram which includes a light source, an image hologram member for forming an image when illuminated by the light source, and a guard hologram member for blocking ambient turn-on of the image hologram.

The invention may be used with holograms that create an image in environments susceptible to ambient turn-on, such as that shown in U.S. Pat. No. 4,892,369, and provides an additional guard or blocking hologram which eliminates that ambient turn-on. The preferred embodiment of the invention blocks ambient turn-on which has occurred from being viewed by an observer. However, the invention may also be used to block ambient turn-on from occurring.

The preferred embodiment of the present invention is used in the rear window stoplight hologram environment, and includes a 0-degree reflection hologram, a halfwave plate, and a second 0-degree reflection hologram, all laminated together in a sandwich. The guard hologram sandwich of the preferred embodiment is bonded to the image hologram on the side facing the light source to block the ambient turn-on radiation from reaching the driver. This sandwich configuration is seen to prevent the maximum amount of ambient illumination, while allowing the hologram to be activated with the light source and still permitting the optimum optical transparency for the driver's rear view.

BRIEF DESCRIPTION OF THE DRAWINGS

The present invention, both as to its organization and manner of operation, together with further objects and advantages, may be understood by reference to the following description, taken in connection with the accompanying drawings.

FIG. 2 is a side view illustration of a deck-mounted holographic center high-mounted stoplight and illustrates the phenomenon of ambient turn-on;

FIG. 3 is a side view illustration quantitatively describing the phenomenon of ambient turn-on;

FIG. 4 is a table illustrating the wavelengths and angles of incident sunlight which reach a rearview mirror in a holographic stoplight configuration;

FIG. 5 is a table which illustrates the stoplight hologram's efficiency versus incident angle and wavelength;

FIG. 6 is a table which illustrates the relative brightness of light reaching a rearview mirror in a holographic rearview stoplight configuration;

DETAILED DESCRIPTION OF THE PREFERRED EMBODIMENTS

The following description is provided to enable any person skilled in the optical and automotive fields to make and use the invention, and sets forth the best modes contemplated by the inventor of carrying out his invention. Various modifications, however, will remain readily apparent to those skilled in the art, since the generic principles of the present invention have been defined herein specifically to provide a relatively economical and easily manufactured hologram assembly.

Figure 1:
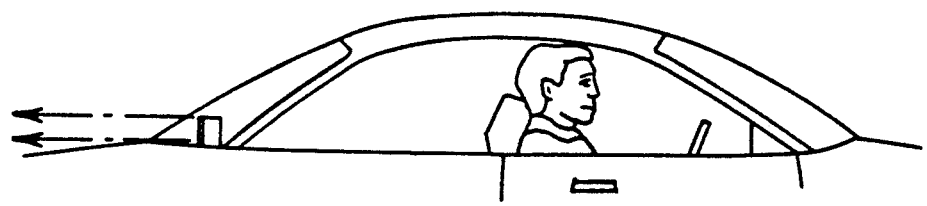
FIG. 1 is a side view illustration of a conventional deck-mounted rearview stoplight.
Figure 2:
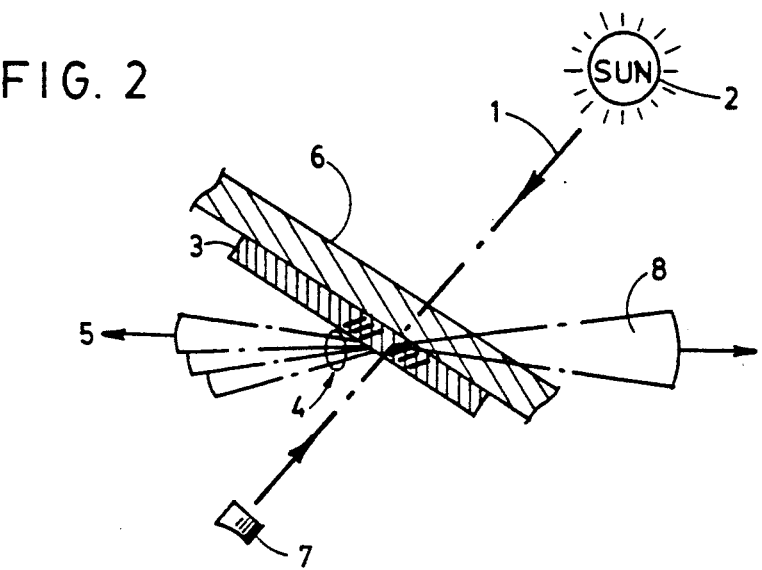

The phenomenon of ambient turn-on in the decklit floodlit center high-mounted stoplight is illustrated in FIG. 2. The stoplight operates by diffracting incident light from a projector 7. The diffracted light 8 from the projector 7 is seen by drivers following the vehicle (not shown).

However, some of the rays 1 from the sun 2 that are incident on the image hologram 3 attached to the rear window are diffracted into bundles of light 4 that enter the car interior. Some of the diffracted sunlight 4 from these bundles reaches the driver's vision via the rearview mirror 5.

Figure 3:
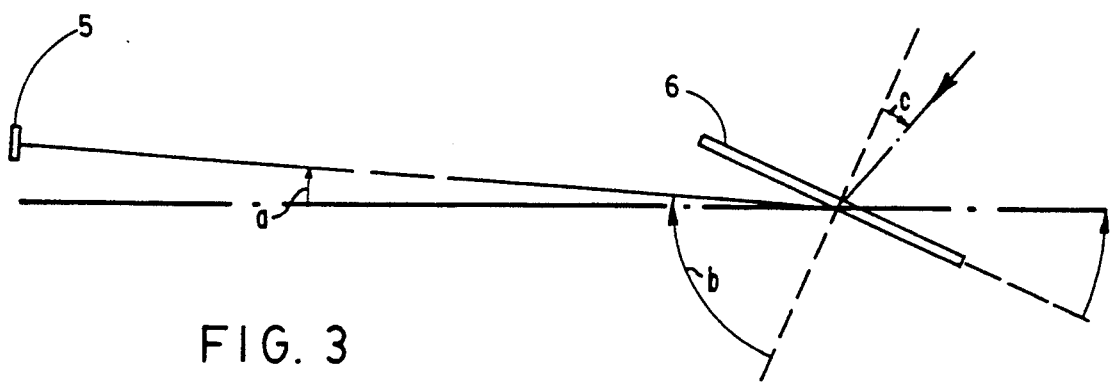

As shown in the geometry of FIG. 3, having a rear view mirror 5, 2.04 inches tall and 76.2 inches from the stop light hologram 6, any light bundle diffracted forward in the car along a +3.9±0.77-degree angle a relative to horizontal (or 69.9 degrees relative to the hologram normal b) will reach the mirror 5 and interfere with the driver's vision. In the geometry of FIG. 3, a 16-degree Bragg angle c is present when the incident light being considered has a wavelength of 610 nm.

FIG. 4 shows a table indicating which combinations of incident angles and wavelengths result in light reaching the rearview mirror in the particular geometry and configuration shown. Incident light reaching the mirror is indicated in the table by "1", and an absence of light is indicated by "0." FIG. 4 assumes that the image hologram is designed to project its image along a −7-degree to +12-degree vertical field. If the hologram were lower on the backlight, the rearview mirror were higher in the car, or the hologram had less vertical diffractive spread, then some of the lower incident angles and wavelengths that are shown to reach the mirror would miss it.

FIG. 5 is a table which maps the hologram diffraction efficiency versus incident angle and wavelength for the configuration and geometry of interest in FIG. 4. The calculations are based on a 10μ thick gelatin hologram which is optimized for efficiency at 610 nm and 16 degrees incident angle. Narrower spectral and angular bandwidths could be achieved by increasing the gelatin thickness and decreasing the index modulation; however, this would reduce the image hologram's brightness.

FIG. 6 is a table which shows the overall brightness of light reaching the mirror versus incident angle and wavelength. FIG. 6 is produced by multiplying FIG. 4 by FIG. 5, and further multiplying the result by the photopic response curve. The photopic response curve defines the human eye's spectral sensitivity. By comparing FIGS. 5 and 6, it is apparent that the photopic response curve reduces the range of wavelengths that must be blocked by a guard hologram, because the photopic response curve approaches zero in the deep red wavelengths of the spectrum.

FIG. 6 indicates the most favorable responses of a guard hologram placed in a center high-mounted stoplight holographic environment. If the guard hologram is placed between the sun and the image hologram shown in FIGS. 2 and 3, then it should be highly efficient for the wavelengths and incident angles where ambient turn-on is a problem, as indicated by FIG. 6. If the guard hologram is placed between the image hologram and the lamp, then it should block light between 530 nm and 610 nm which is incident on the guard hologram at 69.9 degrees relative to normal. Since the image hologram diffracts both "s" and "p" polarizations strongly (p-polarized efficiency is roughly 80% the s-polarized efficiency), the guard hologram must block both polarizations.

S-polarization is linearly polarized light whose vector of polarization lies perpendicular to the plane of incidence. The plane of incidence is that plane which encompasses both the incident ray and the surface normal vector. P-polarization is linearly polarized light whose vector of polarization lies parallel to the plane of incidence.

Hologram fringes are the imaginary surfaces within the film along which the refractive index is maximum. The hologram fringes are not angularly dependent. However, the hologram diffraction efficiency (defined as the diffracted light divided by the incident light) is highly dependent on incident angle. The incident angle at which the hologram has maximum diffraction efficiency is called the Bragg angle. The Bragg angle is determined by the fringe tilt and the spacing between the fringes.

As the incident angle deviates from the Bragg angle, the hologram efficiency decreases. The range of angles over which the hologram efficiency is 50% or greater than the efficiency at the Bragg angle is called the full-width half-maximum angular bandwidth. The hologram angular bandwidth increases with increasing index modulation and increasing interfringe spacing.

In addition, there are several other requirements for using the guard hologram of the present invention in the center high-mounted stoplight holographic environment of the preferred embodiment:

(1) The combination of guard hologram, image hologram, and backlight should have an illuminant "A" luminous transmittance at normal incidence of greater than 70%. Illuminant "A" is a standard illumination source that approximates a blackbody and has a color temperature of roughly 2856° K. Luminous transmittance is the integrated transmittance over the visible spectrum using a detector whose response approximates that of the human eye and, therefore, measures luminous energy instead of radiometric energy. The "illuminant A" luminous transmittance is the luminous transmittance of a sample such as the rear window when an Illuminant A source is used.

(2) The see-through discoloration of the guard hologram when viewed from the rearview mirror should be minimized.

(3) The guard hologram should send the unwanted rays in a direction that does not cause other problems.

(4) The guard hologram should not interfere with red light from the projector diffracting off the image hologram and towards the rear field to be viewed by drivers following the car.

(5) The guard hologram should not cause any projector light to be directed toward the driver's rearview mirror.

(6) The guard hologram should be parallel to, and in physical contact with, the backlight.

Several designs were tested for fulfilling these characteristics for a decklit center high-mounted stoplight guard hologram in the rearview stoplight embodiment shown. These designs are illustrated in FIGS. 7-13.

Sun-Facing 0-Degree Reflection Hologram

Figure 7:
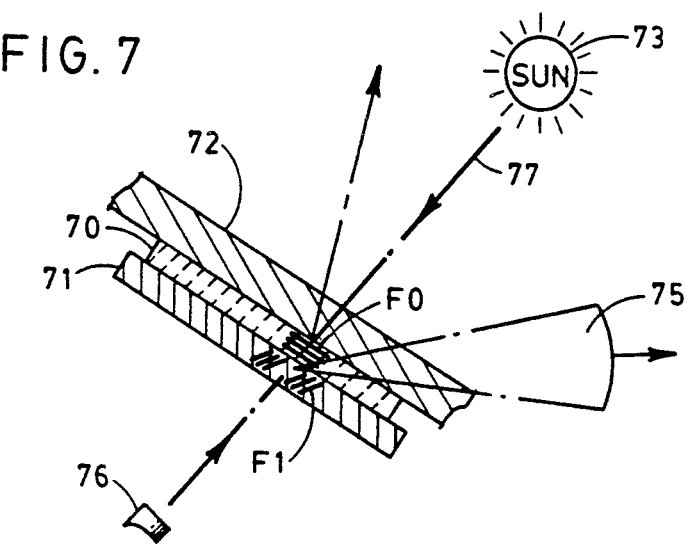
FIG. 7 is a side view illustration of a sun facing 0-degree reflection guard hologram configuration.

In the design shown by FIG. 7, a guard hologram 70, is placed between the image hologram 71 and the rear window 72. The guard hologram 70 is therefore between the image hologram 71 and the ambient source 73.

The hologram layers 70, 71 can be formed of conventional film coatings, such as photopolymer or a dichromated gelatin, such as disclosed in known reference books, e.g., "Dichromated Gelatin for the Fabrication of Holographic Optic Elements" by Chang et al., *Applied Optics*, Vol. 18, pages 2407-17 (1979). Various layers may be combined by coating the surfaces with a known optical cement (not shown) which will not inhibit the optical path.

In the embodiments shown herein, the hologram layers 70, 71 include fringe patterns F0, F1, respectively. These fringe patterns have parallel fringes F0, F1 and form a diffraction grating at a predetermined angle to the source of interest. For example, the image hologram 71 contains the diffraction grating F1 which provides a rear diffracted beam 75 along a specific angular path when illuminated by the projector 76. The hologram 71 and diffraction grating F1 are designed so that for the specific wavelength and incident angle of the illumination from the projector 76, the light is diffracted along this path. The method of producing a hologram in this manner is fully discussed in U.S. Pat. No. 4,892,369.

The diffraction grating F0 in the guard hologram 70 is situated so that it has a predefined response at a specified angle of the ambient source or sun 73. In the design shown in FIG. 7, the guard hologram 70 is designed with a diffraction grating F0 whose maximum response is dictated by the table shown in FIG. 6.

This guard hologram 70 reflects the desired sunrays 77 before they reach the image hologram 71. In order to prevent ambient turn-on, this hologram 70 has a peak wavelength reflection at a normal incidence of 579 nm and approximately an 80 nm spectral bandwidth (FWHM). This design does not provide favorable results because these requirements cause it to fall below the 70% transmittance level discussed above. Furthermore, its peak reflection band, when viewed from the driver's rearview mirror, and its FWHM bandwidth for s-polarized light is greater than 80 nm and centered at around 470 nm. This will cause some objectionable see-through discoloration, hindering the driver's rear field of view.

Lamp-Facing 0-Degree Reflection Hologram

Figure 8:
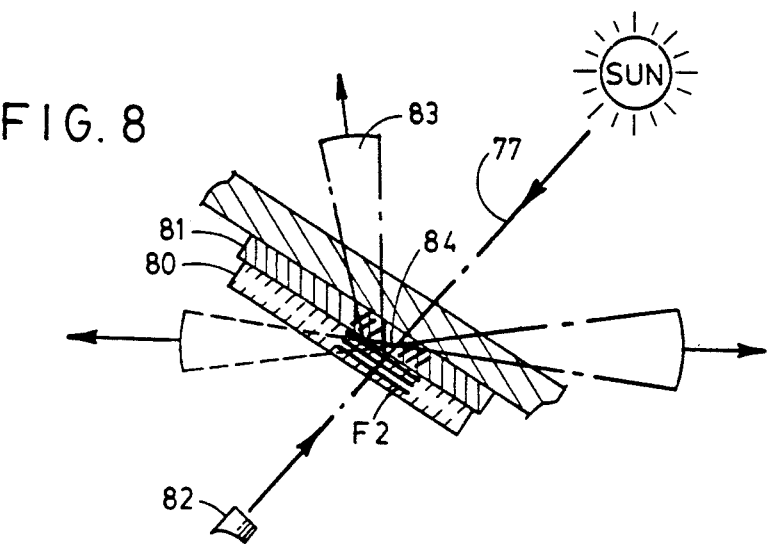
FIG. 8 is a side view illustration of a lamp facing 0-degree reflection guard hologram configuration.

FIG. 8 illustrates a guard hologram 80 placed between the image hologram 81 and the illuminating source 82. For the rearview stoplight configuration, this guard hologram 80 should block light between 530 nm and 610 nm, which is incident on the guard hologram 80 at 69.9 degrees relative to the normal from the hologram. For this purpose, the guard hologram 80 includes a diffraction fringe pattern F2, which includes parallel fringes at a particular configuration sufficient to reflect diffracted sunlight 84 away from the rearview mirror, such as in the direction 83.

After the image hologram 81 has diffracted the sunlight 77, this hologram 80 reflects the desired rays 83 away from the rearview mirror (not shown). This hologram has one serious drawback—it allows the p-polarized light from the image hologram 81 to pass through and reach the rearview mirror. In the case of dichromated gelatin guard holograms, where the index drops with increasing hologram efficiency, p-polarized efficiency is probably no greater than 25% and the p-polarized bandwidth is only 10-15 nm. If photopolymer is used, some improvement in p-polarized efficiency is likely. However, a significant portion of the p-polarized light will still be transmitted to the mirror.

Since this guard hologram 80 blocks rays between 530 nm and 610 nm from reaching the rearview mirror, there will be significant see-through discoloration when the driver is using his rearview mirror to view the environment behind him. This is aesthetically unpleasing and may cause a psychological obstruction in his view. Indeed, any lamp-facing guard hologram may have this see-through discoloration unless the overall usage specifications can be changed; by narrowing the image hologram bandwidth, for example.

Sun-Facing Slant Fringe Reflection Hologram

Figure 9:
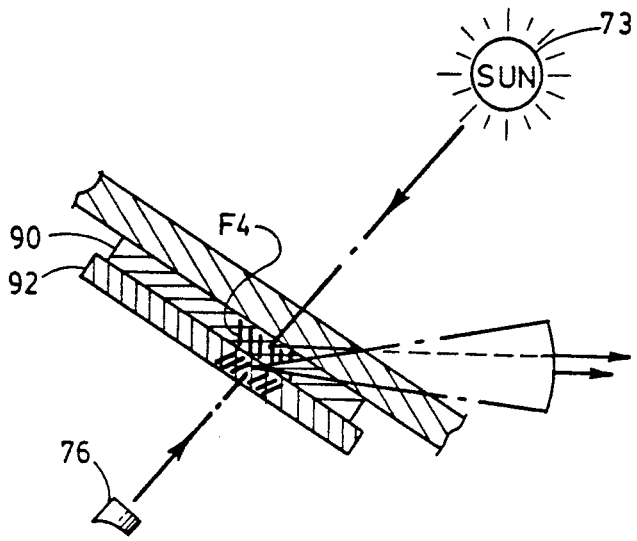
FIG. 9 is a side view illustration of a sun facing slant fringe reflection guard hologram configuration.

FIG. 9 illustrates a design very much like that shown in FIG. 7. However, the guard hologram 90 includes a fringe pattern F4 where the fringes are parallel and slanted away from a normal axis to the incident ambient source: the sun 73.

This guard hologram 70 provides no advantage over the sun-facing 0-degree reflection hologram shown in FIG. 7, and has the added disadvantages of producing hologram flare and requiring a nonscanning laser exposure. Furthermore, light from the projector 76 which passes undiffracted through the image hologram 92 will be partially diffracted by the guard hologram 90 and directed towards the rearview mirror, a phenomenon which is not acceptable.

Lamp-Facing Slant Fringe Reflection Hologram

Figure 10:
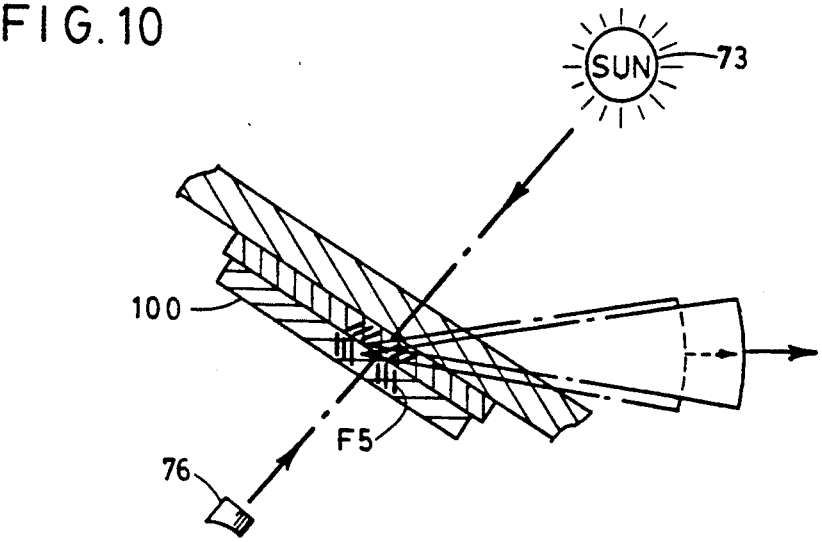
FIG. 10 is a side view illustration of a lamp facing slant fringe reflection guard hologram configuration.

The design shown in FIG. 10 has the same configuration as the design shown in FIG. 8, with the exception that the guard hologram 100 contains a fringe pattern F5 which is slanted away from a normal to the axis to the projector 76.

The advantage of this guard hologram 100 over the lamp-facing 0-degree reflection hologram shown in FIG. 8 is that this hologram 100 has no polarization problem—both s-polarized and p-polarized light are diffracted strongly. However, at normal incidence, the hologram 100 has a peak wavelength of around 460 nm and a spectral bandwidth of greater than 80 nm for s-polarized light. Thus at normal incidence the hologram 100 falls below the 70% transmittance test.

Lamp-Facing Transmission Hologram

Figure 11:
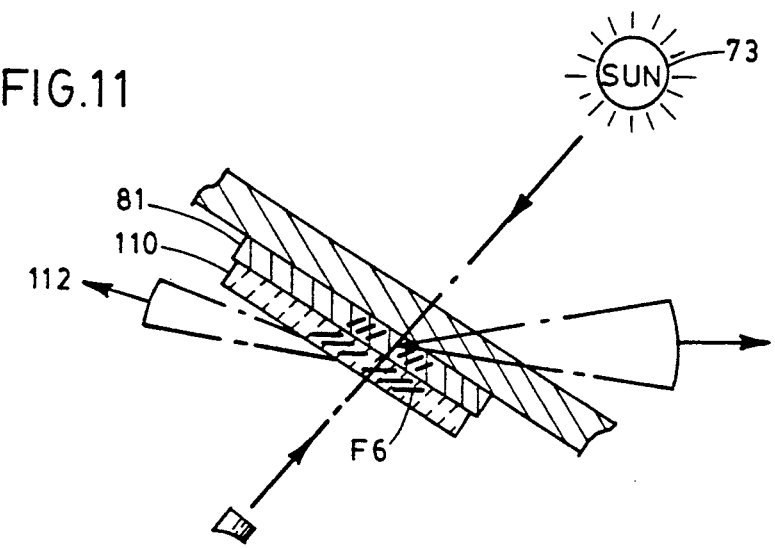
FIG. 11 is a side view illustration of a lamp facing transmission guard hologram configuration.

FIG. 11 depicts a guard hologram design configuration which is similar to that shown in FIGS. 8 and 10 in that the guard hologram 110 is on the projector side of the image hologram 81. The guard hologram 110 allows the diffracted light to exit the hologram surface on the opposite side from which it was incident.

The sunlight 77 diffracted by the image hologram 81 is rediffracted by the guard transmission hologram grating F6 toward the roof of the car 112. This guard hologram 110 blocks both polarizations, and it conforms to the 70% transmittance specification. However, the hologram flare produced is likely to significantly interfere with the driver's viewability through the optically transparent hologram. Furthermore, higher order flare terms in the guard hologram 110 may cause ambient turn-on. Additionally, it is undesirable to divert the unwanted light to the roof of the car. This guard hologram 110 cannot divert it elsewhere, such as to the deck of the car, without losing p-polarized efficiency.

Sun-Facing Transmission Hologram

Figure 12:
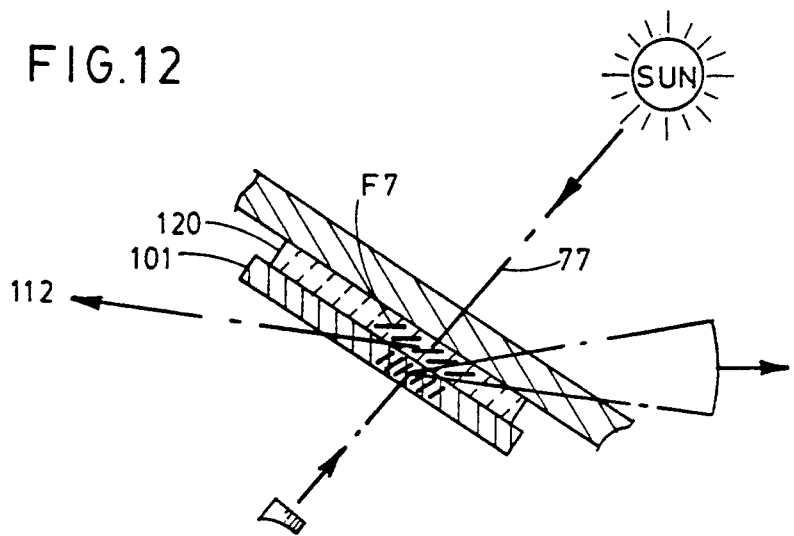
FIG. 12 is a side view illustration of a sun facing transmission guard hologram configuration.

FIG. 12 illustrates a guard hologram configuration similar to that shown in FIGS. 7 and 9. However, in the guard hologram 120 of FIG. 12, the fringe configuration F7 is slanted upwardly and away from from the direction of impact of the incident sunlight 77.

The guard hologram 120 diffracts the desired sunrays 77 towards the roof of the car 112 before it can reach the image hologram 121. The guard hologram 120 diffracts the light to the roof and not the deck in this geometry. Otherwise, the Bragg angle of the guard hologram 120 would increase with increasing wavelength, which is contrary to what is shown in the table of FIG. 5. This guard hologram 120 has the same drawbacks as the lamp-facing transmission guard hologram shown in FIG. 11.

0-Degree Hologram/Halfwave Film/0-Degree Hologram

Figure 13:
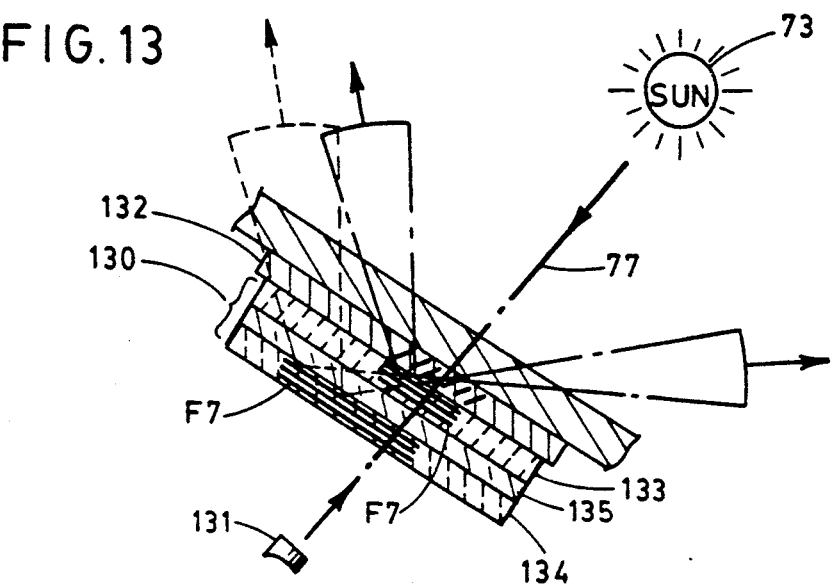
FIG. 13 is a side view illustration of a 0-degree reflection/halfwave film/0-degree reflection guard hologram configuration which is utilized in the preferred embodiment of the invention.
Figure 14:
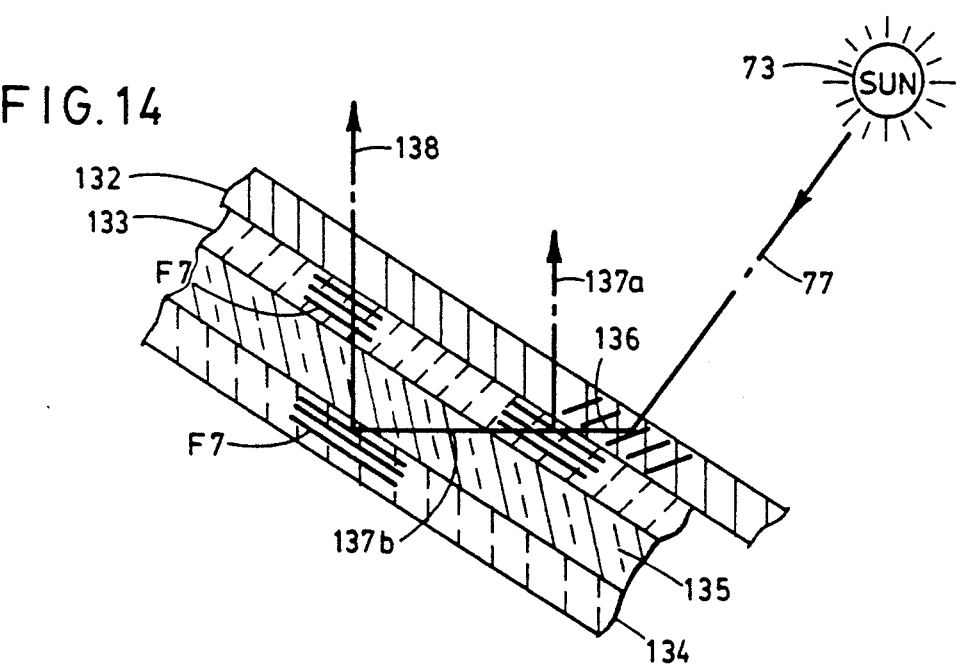
FIG. 14 is a side view illustration of a 0-degree reflection/halfwave film/0-degree reflection guard hologram configuration which is utilized in the preferred embodiment of the invention.

FIGS. 13 and 14 illustrate the preferred embodiment of the invention for the rear window stoplight configuration discussed herein. In this configuration, the entire guard hologram member 130 is placed between the projector 131 and the image hologram 132. The guard hologram member 130 is disposed on the opposite side of the image hologram 132 from the ambient source or sun 73.

In this embodiment, the guard hologram member 130 consists of three components: a first guard hologram 133, a second guard hologram 134, and a halfwave film 135 placed therebetween. Each of the guard reflection hologram components 133, 134 have fringe configurations F7 which are parallel to the hologram surface.

The ambient radiation 77 from the sun 73 is randomly polarized. In this configuration, the ambient radiation 77 impinges on the image hologram 132, and is diffracted along path 136 while maintaining a predominantly random polarization. The first guard hologram 133 reflects more than 99% of the s-polarized light, allowing only p-polarized light to be transmitted. This is illustrated in FIG. 14, where the reflected s-polarization is labeled 137A, and the transmitted p-polarization is labeled 137B.

The transmitted p-polarized light 137B follows an optical path through the halfwave plate 135 to the second guard hologram 134. The halfwave plate 135 rotates the p-polarized light 137B to s-polarization, at which state the leftover ambient component 137b encounters the second guard hologram 134.

The second guard hologram 134 reflects more than 99% of the ambient component 137B, which is now almost wholly s-polarized. The second guard hologram 134 reflects the radiation towards the halfwave film 135.

The reflected ambient radiation now follows an optical path 138 through the halfwave plate 135. The halfwave plate 135 rotates the s-polarized component back to the p-polarized component, so that when the ambient radiation again reaches the first guard hologram 133, it is p-polarized and transmitted through the first hologram member 133 and out of the car.

The preferred embodiment thus blocks both s-polarized and p-polarized light. This embodiment meets all of the above-defined qualities in the rear stoplight configuration.

This embodiment passes the 70% transmission requirement, it rejects unwanted rays from the car interior, it is invisible to the image hologram projector, it is compatible with a scanning exposure system, and it has no slanted fringes which might interfere with viewability or cause additional ambient turn-on problems.

This embodiment blocks light with a 530 nm–610 nm range from reaching the mirror from the outside, and therefore exhibits some see-through discoloration. However, this problem is minimal.

The best mode now seen by the inventor of the reflection hologram members 133, 134 which may be used in a guard hologram assembly 130 has the characteristics shown below. This mode is mounted with the floodlit image hologram 132 in the rear window of a vehicle having the geometry and configuration discussed:

0-degree hologram fringe

Greater than 99% peak efficiency at 570 nm, 80 nm BW FWHM at 69.9-degree incident angle for s-polarized light Size large enough to entirely cover the decklit image hologram 1 mil Mylar/DuPont photopolymer reflection hologram/1 mil Norland/halfwave film/1 mil Norland/DuPont photopolymer reflection hologram/1 mil Mylar assembly The specification of the halfwave film should be as follows:

Near-halfwave retardance at 570 nm±40 nm at 69.9 degrees incident angle.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A hologram for use with a vehicle with a rear window, comprising:
   (a) a light source;
   (b) an image hologram member for forming an image when illuminated by the light source;
   (c) a separate guard hologram member for blocking ambient turn-on of the image hologram wherein the guard hologram is mounted relative to the image hologram opposite an ambient source exterior to the vehicle and incident on the outside surface of the read window of the vehicle and wherein said image hologram is located between the ambient source and said separate guard hologram; and
   (d) said guard hologram includes two reflection holograms separated by a halfwave plate.

2. The apparatus of claim 1 wherein the guard hologram member is an optically bonded sandwich.

3. The apparatus of claim 1 wherein the image hologram is a centered high-mounted stoplight holographic image.

4. The apparatus of claim 1 wherein the image hologram is a centered high-mounted stoplight holographic image, and the guard hologram prevents ambient turn-on from interfering with a driver's rear view vision.

5. The apparatus of claim 4 wherein the guard hologram minimizes the amount of luminous energy of ambient turn-on light which interferes with the driver's rear view vision.

6. The apparatus of claim 5 wherein the interfering light is spatially truncated by a rear view mirror.

7. The apparatus of claim 1 wherein the guard hologram member includes at least one diffraction grating having a fringe pattern wherein the fringes are parallel to one another.

* * * * *